US008582760B2

(12) United States Patent
Rosati et al.

(10) Patent No.: US 8,582,760 B2
(45) Date of Patent: Nov. 12, 2013

(54) METHOD AND SYSTEM OF MANAGING AND FILTERING ELECTRONIC MESSAGES USING CRYPTOGRAPHIC TECHNIQUES

(75) Inventors: Tony Rosati, Ottawa (CA); Scott A. Vanstone, Campbellville (CA); Daniel R. Brown, Mississauga (CA)

(73) Assignee: Certicom Corp., Mississauga (CA)

( * ) Notice: Subject to any disclaimer, the term of this patent is extended or adjusted under 35 U.S.C. 154(b) by 1969 days.

(21) Appl. No.: 11/334,465

(22) Filed: Jan. 19, 2006

(65) Prior Publication Data

US 2007/0053510 A1    Mar. 8, 2007

(30) Foreign Application Priority Data

Jan. 20, 2005 (CA) ..................................... 2493442

(51) Int. Cl.
*H04K 1/00* (2006.01)
(52) U.S. Cl.
USPC .............. 380/30; 713/168; 713/170; 713/176
(58) Field of Classification Search
USPC ................. 709/206; 380/30; 713/188, 171
See application file for complete search history.

(56) References Cited

U.S. PATENT DOCUMENTS

| 6,161,130 | A  | * | 12/2000 | Horvitz et al. ................ 709/206 |
| 6,289,105 | B1 |   | 9/2001  | Murota |
| 6,334,140 | B1 |   | 12/2001 | Kawamata |
| 6,389,532 | B1 |   | 5/2002  | Gupta et al. |
| 6,393,568 | B1 |   | 5/2002  | Ranger et al. |
| 6,574,658 | B1 | * | 6/2003  | Gabber et al. ................ 709/206 |
| 7,392,523 | B1 | * | 6/2008  | Stahl et al. ................... 717/177 |
| 2002/0181703 | A1 |  | 12/2002 | Logan et al. |
| 2005/0188020 | A1 | * | 8/2005 | Avritch et al. ............... 709/206 |
| 2005/0257057 | A1 | * | 11/2005 | Ivanov et al. ............... 713/171 |
| 2007/0143407 | A1 | * | 6/2007 | Avritch et al. ............... 709/206 |

FOREIGN PATENT DOCUMENTS

| JP | 08-235088 A | 9/1996 |
| JP | 11-098177 A | 4/1999 |
| JP | 2003-244240 A | 8/2003 |
| WO | WO 00/10288 | 2/2000 |
| WO | WO 01/97089 A1 | 12/2001 |
| WO | WO 02/096016 A2 | 11/2002 |
| WO | WO 2004/095204 A2 | 11/2004 |
| WO | WO 2004/105332 A2 | 12/2004 |

OTHER PUBLICATIONS

Adachi Tsukasa, Akaba Yasuhiko, Ozaki Masami, Hashimoto Koji and Sasaki Ryoichi; Ango Mail nickeru Kojin Jyoho Fusei Sosyutsu Check System no Hyoka ("Evaluation of Private Information Illegal Sending in Encrypted Mail"; Proceedings of the Computer Security Symposium in 2004, Japan, vol. I of II; The Institute of Electronics, Information and Communication Engineers; Oct. 20, 2004; pp. 1 to 6; vol. 2004, No. 11.

(Continued)

*Primary Examiner* — Jeffrey Pwu
*Assistant Examiner* — Carlos Amorin
(74) *Attorney, Agent, or Firm* — John R. S. Orange; Blake, Cassels & Graydon LLP

(57) ABSTRACT

Undesirable electronic messages, such as the unsolicited broadcast e-mail known as spam, is not only a nuisance, but wastes both computer and user resources. Conversely, desirable electronic messages with sensitive content is important to secure, so that it is not forged, tampered or revealed. Accordingly, the present invention provides cryptographic methods that simultaneously secures electronic communication and helps fight spam.

27 Claims, 10 Drawing Sheets

(56) References Cited

OTHER PUBLICATIONS

Rigoutsos, I. et al.; "Chung-kwei: A Pattern-discovery-based System for the Automatic Identification of Unsolicited E-mail Messages (SPAM)"; First Conference on Email and Anti-Spam (CEAS2004); 2004; Retrieved online Dec. 20, 2011 from http://research.microsoft.com/en-us/um/people/joshuago/conference/papers-2004/153.pdf.
Menezes, A. et al.; Handbook of Applied Cryptography; Aug. 2001, Fifth Printing; pp. 181 to 183; CRC Press; www.cacr.math.uwaterloo.ca/hac/.
Goodman, J. et al.; "Spam and the ongoing battle for the inbox"; Communications of the ACM; Feb. 2007; pp. 25 to 33; vol. 50, Issue 2.
English translation of Office Action issued Dec. 28, 2011 in connection with corresponding Japanese Application No. 2007-551521.
Suppplementary European Search Report issued on Jun. 8, 2010 in corresponding European application No. 06 70 1776.
Tompkins T; Handley D: "Giving e-mail back to the users. Using digital signatures to solve the spam problem" vol. 8, No. 9, Sep. 1, 2003, pp. 1-11.
Kai-Jie Chang; Chin-Chen Chang "An E-Mail Signature Protocol for Anti-Spam Work-in-Progress", ACM International Conference Proceeding Series; Proceedings of the $2^{nd}$ International Conference on Scalable Information Systems, vol. 304, Jun. 8, 2007, Suzhou, China.
Lawton G: "E-Mail Authentication is Here, but Has it Arrived Yet?", IEEE Computer Society Press, vol. 38, No. 11, Nov. 2005, pp. 17-19, Los Alamitos, CA, USA.

* cited by examiner

METHOD AND SYSTEM OF MANAGING AND FILTERING ELECTRONIC MESSAGES USING CRYPTOGRAPHIC TECHNIQUES

FIELD OF INVENTION

The invention relates generally to the field of managing electronic messages. In particular, the invention relates to a system and method for managing electronic messages and filtering unsolicited and unwanted electronic messages.

BACKGROUND OF INVENTION

As we are all aware, unsolicited and unwanted e-mail, commonly referred to as "spam e-mail", is becoming a very significant annoyance and overall problem for all who use e-mail. More recently, there has also been a rise of broadcasting of unsolicited electronic messages to handheld communication devices, such as broadcasting short text messages to cell phones, or broadcasting instant pop-up messages to personal computers running certain operating systems, or broadcasting digitized phone messages, or voice mail, to users of Voice over Internet Protocol (VoIP) technologies. Spammers, i.e., those who indiscriminately broadcast spam messages to a large number of recipients, flood the Internet with all kinds of advertisements and solicitations that most people would prefer not to see or hear. It is generally estimated that spammers send out bulk mailings that are typically in the billions of messages per day. Estimates indicate that most e-mail traffic, and a considerable percentage of total Internet traffic, is spam.

Spammers typically find recipient network addresses, such as e-mail addresses, by buying e-mail lists, by scouring web pages for e-mail addresses (in some instances, an e-mail address posted on a web site receives spam e-mail within a few minutes of posting), and by probing for likely addresses by attaching likely user names to registered domain names. Spammers may also scan mailing lists, and can theoretically scan all e-mail or similar Internet traffic that passes through their servers to harvest valid user network addresses therein.

Various solutions have been devised to fight spam. What follows merely highlights some of the difficulties these methods face in fighting spam e-mail, though they also apply to fighting other forms of spam.

Spam is fought today mainly by use of filters. Filters scan sender network address, subject line and content, looking for telltale signs of spam. Spammers often obtain new, legitimate, publicly available but cheap network addresses to avoid getting caught by sender address filters, at least for a while. Spammers often also spoof sender addresses, by falsely using, for example, an e-mail address of somebody else whose e-mail address is likely to be on the white list of spam e-mail filters. Spoofing e-mail addresses can create headaches for those whose addresses are spoofed because they may get flooded with angry responses from recipients of spam e-mail, or filters may start to block their genuine e-mail messages.

Filtering based on subject line and content is generally effective only for a short time as spammers have been able to devise countermeasures to bypass such filters. For example, some filters look for certain words that are considered appearing most likely only in spam e-mail and attempt to detect them. Spammers react to these filters by changing the words that are commonly scanned by the filters, or spelling these words in different incorrect ways that are human readable, but random enough so that filters cannot keep up with the variations. On the other hand, such filters occasionally will capture legitimate e-mail messages. Other kinds of filters try to detect good e-mail messages by searching for words that do not occur in typical spam e-mail. Spammers have managed to bypass this kind of filters by appending random words to spam e-mail. Therefore, these kinds of filters need constant revision, as spammers try to bypass them. Today, most filters may let as high as about 10% of spam e-mail through, and still occasionally block legitimate e-mail messages.

Phishing is another application of identity spoofing, wherein the sender address of e-mail is forged. The phisher sends out an e-mail, usually as a broadcast like spam, alleging to originate from legitimate authority such as a bank. The e-mail message requests recipients to take some action, such as to log on to a web site and enter an online banking password. This web site is usually an illegitimate imitation of the genuine site of identical appearance and very similar web address. The recipients may be tricked and blithely enter the online banking password and account number into the site as requested. Phishers can in this way gather account numbers and matching passwords, which then allow them to control victims' online accounts and clean out their bank deposits. Even if only 1% of recipients respond, the phishers can cause significant financial damages.

Phishing can also take the form of asking recipients to respond with e-mails, at which point the recipients enter a dialogue in which they are instructed to deposit money into certain accounts, often of some alleged African prince attempting to get some fortune out of his country in a promised exchange for an award millions of dollars for the recipients that the recipients will never see. Another form of phishing is to send a virus executable with some spoofed identity of somebody who appears trustworthy, such as a colleague.

Phishing tends to be harder than spam to fight with filters that scan sender address and message content. One reason is the identity spoofing. Phishers may also attempt to match subject line and content of their e-mail as closely as possible to legitimate e-mail, whereas most the advertising content of most spam e-mail gives it away immediately.

Communication by electronic means is not likely to go away soon. Instead, its importance is likely to increase and more and more types of data, from text to graphics to audio or video data, may be transferred and communicated to recipients in electronic form. While this may provide convenience to correspondents, it also provides opportunities to spammers to expand their spam activities. Lost productivity and cost associated with processing, reviewing and deleting spam messages is generally regarded to be unacceptably large. If spammers' and phishers' capabilities to bypass conventional filters increase or if their use of identity spoofing increases, more powerful filters than today's reactive filters may be needed. If spammers and phishers are able to increase their bypass rates against conventional filters to significantly more than 10%, stronger filters will be especially desirable.

Cryptographic techniques are available for delivering encrypted and authenticated electronic messages. Today's cryptographic algorithms generally are deemed unbreakable. This can be used to secure network traffic, including e-mail, protecting it from modification, from forgery and from eavesdropping. Traditionally, however, cryptography has been used to protect high value traffic, such as financial transactions or financial data. Internet Engineering Task Force (IETF) has developed the S/MIME (Secure Multipurpose Internet Message Extensions) protocol that can be used to secure e-mail or data transferred using e-mail. Exclusive use of S/MIME would help prevent spam or phishing e-mail, however, it could also prevent certain normal business-to-business communications.

One of the problems with securing e-mail, and one reason it is not yet prevalent today, relates to the inconvenience of today's public key infrastructure (PKI). Typical e-mail users generally consider it difficult to obtain a public key certificate because the process of registering a certificate with a certification authority (CA) is typically considered expensive and complex. Further, S/MIME has the drawback of interoperability—it uses digital certificates that must be signed by a root authority. PGP is another technique that basically delivers the same functionality as S/MIME and has similar limitations.

An alternative to a full PKI is for users to issue themselves self-signed certificates. From security standpoint, this is not completely ideal. In the context of e-mail, it is possible for users to register each other's certificates without the intervention of the CA, and usually this is sufficient. However, when making new acquaintances, the onus is on user to determine if the certificate is legitimate. For example, anyone could generate a self-signed certificate in the name of some well-known celebrity. The user would have to determine, without the aid of the certification authority (CA), whether this e-mail indeed corresponds to the celebrity. This is a limitation of not using a full PKI.

It is an object of the present invention to mitigate or obviate at least one of the above mentioned disadvantages.

SUMMARY OF INVENTION

The inventors have recognized that cryptography can be used to limit the quantity of bad traffic, such as spam, without encumbering normal traffic. The solutions use public key cryptographic techniques. Each outgoing message includes a result obtained from a cryptographic operation on a message data from a sender, or may consist entirely of the result. The result is verified using cryptographic techniques by a recipient. Messages verified successfully are routed to a trusted folder. Those that fail the verification are routed to an untrusted folder that may be discarded at will. The verification process thus acts as a filter between trusted and other messages. Optionally, messages from a known spammer as determined in the verification process may be deleted immediately.

In one aspect of the invention, a sender digitally signs a message before it is sent to a recipient. Each user of an electronic messaging system has a pair of keys, one public and one private. Public keys are shared among correspondents in a trusted fashion, i.e., they are considered private among the selected group of correspondents using the electronic messaging system. Before a recipient accepts trusted messages from a sender, the intended recipient first accepts the sender's public key once. Accepted public keys are stored at the client and they are used to verify digitally signed and optionally encrypted electronic messages. Messages that are verified successfully are sent to a trusted or priority folder.

For an organization that represents a user community, its message server or adjunct server can hold users' public keys and do the verification on users' behalf. An entire organization may be treated as a user. Organizations can have a key pair that represents the organization. Partnering organizations can exchange public keys once and have entire user communities trust each other in one very simple step. Verification is performed at the message server, such as an e-mail server.

In another aspect of the invention, the public key of a recipient, instead of the sender, along with the recipient's network address are published in a publicly available directory or in some other means that will allow another party, namely the sender, to send electronic messages to the recipient. The sender obtains the network address and public key of the recipient and encrypts the message to the recipient.

The recipient (or its message server) does statistical checks on the received electronic message to see if it resembles random data that would be indicative of an encrypted message. If so the electronic message is forwarded to the recipient's trusted inbox as a trusted piece of message. If it fails any of the checks, the electronic message is sent to a different inbox (untrusted inbox). Electronic messages that are not encrypted for the sender will be forwarded to the untrusted inbox.

In yet another aspect of the invention, cryptographic message authentication is achieved with key agreement combined with a message authentication code (MAC). A MAC is always included in an outgoing message. Messages that are authenticated by a recipient are sorted into a trusted inbox. Messages that fail the verification are sent to the untrusted inbox.

In other aspects the invention provides various combinations and subsets of the aspects described above.

BRIEF DESCRIPTION OF DRAWINGS

For the purposes of description, but not of limitation, an embodiment is explained in greater detail by way of example with reference to the accompanying drawings, in which.

DETAILED DESCRIPTION OF EMBODIMENTS

Figure 1:
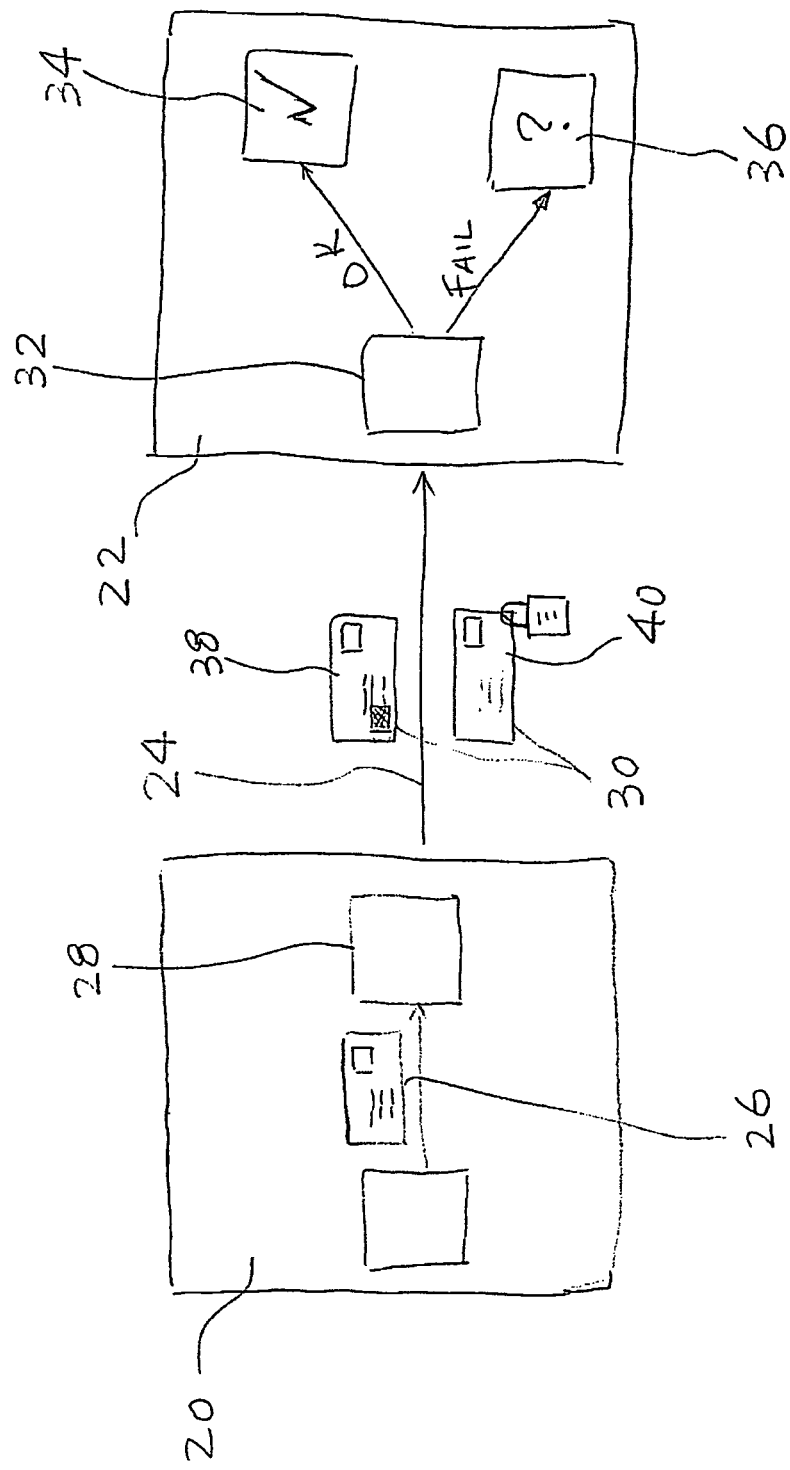
FIG. 1 is a schematic diagram that provides an overview of an electronic message system that uses cryptographic techniques to filter electronic messages.

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

Referring to FIG. 1, there is provided an overview of an electronic message system that uses cryptographic techniques to filter electronic messages. A pair of correspondents or users of the electronic message system, namely a first user, or sender 20, and a second user, or recipient 22, exchange electronic messages through network connection 24 between the pair of users. Each user has a network address at which the user can be reached. For example, in case the electronic message system is an e-mail system, the network address is an e-mail address. In case the electronic message system is a mobile phone text message system, the network address is a phone number.

Message data of all outgoing electronic messages, i.e., clear text messages 26, are processed by the sender's cryptographic processing module 28. It will be appreciated that in this context, "clear text" does not merely refer to human readable text, but refers to all message data in general. For example, S/MIME permits the transfer of binary data, such as audio and video data and graphics files. These binary data are all referred to as "clear text" data or message. Further, it includes all message data prior to being processed by cryptographic processing module 28 and does not exclude data that may be in encrypted form already. A trusted message 30, namely a message containing cryptographic data obtained from a cryptographic operation on clear text message 26 by cryptographic processing module 28, is generated by the sender's cryptographic processing module 28. In other words, a trusted message contains, or may consist of entirely, a result obtained from the cryptographic operation on clear text message 26.

All incoming electronic messages are first scanned by the recipient's filter 32. Filter 32 employs cryptographic techniques to filter all incoming e-mail. Filter 32, of course, may continue to monitor incoming electronic messages for signs of spam or phishing based on traditional techniques, such as subject line or sender address scanning. Users of the system have two folders or two incoming mailboxes. Electronic messages passed the filtering are stored in trusted folder 34; electronic messages rejected by the filter are sent to regular folder 36. Electronic messages stored in trusted folder 34 are treated with higher priority or confidence while regular folder 36 is intended to hold electronic messages of relatively lower priority in comparison. It will be appreciated that there may be levels of acceptance, which will require multiple folders or incoming mailboxes corresponding to the levels of acceptance. For convenience of description, only two mailboxes are shown and described here except where noted. Segregating messages into different folders based on results of verification using cryptographic techniques thus filters trusted messages from other messages.

Although here the first user is designated as sender 20, the same description applies when the pair of users reverse roles, namely when the first user receives and the second user sends electronic messages. It is only for the convenience of description that the first user is designated a sender and the second user is designated a recipient.

Further, in this specification, "sender" is used interchangeably to refer to a user of the system who sends electronic messages, a message software program employed for sending electronic messages by the user such as an e-mail program, or a general-purpose computer on which the message program for sending electronic messages is executed, unless the context requires otherwise. The general-purpose computer typically has a CPU, a memory storage device and a storage device, both accessible to CPU, and input/output (I/O) devices. The message program may be stored on the storage device. Likewise, the term "recipient" is used interchangeably to refer to a user of the system who receives electronic messages, a message software program employed by the user fore receiving electronic messages or a general-purpose computer on which the message program for receiving electronic messages is executed, unless the context requires otherwise.

Prior to sending a clear text message 26, sender 20 first performs a cryptographic operation on clear text message 26. This is done by cryptographic processing module 28 of sender software. Sender 20 may select from a wide spectrum of cryptographic operations for processing the clear text message, depending on the level of filtering desired and acceptable level of computation burden imposed on sender software. Two examples of trusted messages 30 are digitally signed message 38 and encrypted message 40. For example, the cryptographic operation may be one of digitally signing the clear text message 26 or encrypting the clear text message 26. Where sender 20 signs the clear text message 26, trusted message 30 contains a digital signature generated by sender 20. The message may also be signed by sender 20 and then encrypted using sender's own private key. Alternatively, sender 20 may obtain a public key from recipient 22 and encrypt the message using the public key obtained from the recipient.

Upon receiving a message, the recipient's filter 32 examines the message for filtering. Filtering includes a scan of the message text and further cryptographic operations on the message text to verify that the message is a trusted message. The further cryptographic operations are designed to detect that the message contains the result of a previous cryptographic operation or operations on the clear text message 26. A message is successfully verified if the result of such cryptographic operation (or operations) is successfully detected and verified. Only messages that are verified successfully are regarded as trusted messages and routed to the recipient's trusted folder 34.

It will be appreciated that the system described here is not a closed system. Namely, there may exist users of the system who do not employ cryptographic techniques at all or who employ cryptographic techniques but use encryption keys not known to the system or the recipients, among other possibilities. Messages received therefore may consist of clear text data entirely or may contain a result obtained from a cryptographic operation using an unknown key. Unsigned and clear text electronic messages or messages signed with an unknown key are routed directly into the regular folder 36, or a reject inbox. Signed electronic messages that have been signed with a public key in a certificate that the filter has determined belongs to a spammer can also be sent to the regular inbox. Where multiple rejection levels are implemented, recipient 22 may have a special folder, in addition to the trusted and regular folders, to hold electronic messages from known spammers. Electronic messages identified to be from known spammers may also be deleted immediately once detected.

Once a spammer's public key is detected all spam messages it sends will be subject to rejection or deletion. This tends to force the spammer to generate a new key upon its key being recognized as belonging to a spammer. Generating a new key is a moderately expensive cryptographic operation. The spammer incurs a cost each time a new key is required and may be forced to do so. This may be potentially a greater cost than just creating or spoofing some new sender network addresses. Thus the incidence of spam is reduced or deterred by forcing the spammer to incur a computational cost in order to avoid automatic rejection or deletion of spam message.

Requiring a computational cost per recipient means that bulk mailers who send millions of electronic messages will have an additional considerable cost that spammers normally do not have to incur today. This will help reduce the incentive to send spam messages and phishing, since it is virtually free to do so today.

The cost of generating a key may not be a sufficient deterrence to spam, however. The spammer could afford to generate a new key, sign a spam message, and then broadcast the signed message to a million users. As another example of forcing the spammer to incur a computational cost for sending spam messages, the cryptographic operation may include an iterated computation to increase the cost to the spammer. Some examples of iteration computation include repeated hashing or encryption some number of times, such as thousand. The number of iterations depends on the effect desired and the relative capabilities of the user versus the adversaries. Requiring an iterated operation forces the spammer to do more work per broadcast. However, this operation is symmetric in that the recipients, or at least filters acting on their behalf, generally need to perform just as much work as the spammer to verify the iterated computation.

It is preferred that the operation be asymmetric so that the computation load is not balanced as between the sender and the recipient. One such example is to solve a small discrete logarithm problem, which is relatively easy for a recipient to verify but expensive for a sender to generate. This is sometimes known as the puzzle method in the context of denial of service attacks.

To most effectively use iterated computation or puzzles to increase the sender's per-recipient cost, the sender 20 requires a different computation or different puzzle for each recipient 22 and message. This forces the spammer to incur a per recipient and per message computation cost, which tends to severely limit the spammer's ability to send bulk spam messages at virtually no cost. Some examples include making the puzzle or computation a function of a digest of the message, recipient identifier, and possibly the date, to prevent replay attacks. Other examples include combining the puzzle method with digital signatures approach to message authentication, or by making the long computation or puzzle depend on a per-recipient value such as the wrapped key W or the per-recipient MAC tag as will be described in detail later.

Another example of forcing spammers to do more work per broadcast is to filter out unencrypted messages. The sender 20 encrypts the message to the recipient 22 in any of a plurality of ways. Any encryption algorithm may be used. For example, the sender 20 could use a public key and do public-key encryption (e.g., the ECIES in ANSI 9.63) or the sender 20 could send a key using Menezes-Qu-Vanstone (MQV) and then encrypt the message using a symmetric-key scheme such as the AES. Elliptic Curve Cryptography (ECC) is considered better suited than Rivest-Shamir-Adleman (RSA) to the task of deterring spam and phishing because its public key operations are more computationally expensive for the sender (i.e., spammer) than the recipient. RSA on the other hand would impose a less burden on the spammer because encryption is harder for the recipient not the sender, making the spammer's task simpler.

Encrypted messages tend to resemble random data with little or no redundancy. This property can be used by recipient 22 to filter out unencrypted messages. Filters residing on dedicated message servers can detect whether the message content was encrypted, without actually decrypting the message. They can do this rapidly by inspecting the message formatting, which indicates whether or not encryption was used, and also by examining the content directly to inspect whether it appears pseudorandom. For example, instead of attempting to decrypt an encrypted message, recipient 22 does statistical checks on the received electronic message to see if it resembles random data. Some common statistical checks include the welt-known tests: monobit, serial, pokers, runs and autocorrelation, as outlined in Section 5.4.4 of the Handbook of Applied Cryptography, by Menezes, van Oorschot and Vanstone. Other tests include Maurer's universal test and other tests based on compressibility. If the message fails one or more statistical checks, the message is routed to regular folder 36; if the message passes all statistical checks, the message is considered a trusted piece of message and forwarded to the recipient's trusted folder 34. Almost all unencrypted messages will fail the statistical checks and be sent to regular folder 36.

For long messages sent to many recipients, the sender can encrypt the content just once with a content encryption key k. However, encrypting a message requires the sender to do multiple key transport or key agreement operations, one per each recipient to securely transport to each recipient the encryption key k. Therefore, spammers and phishers would incur a per-recipient cost to transport the key, in addition to an encryption operation. On the other hand, as discussed above, a recipient can verify that a message is encrypted The verification is relatively an easy operation. This imbalance of computational requirements deters spammers from sending spam messages or phishing.

In addition to digital signatures, puzzles and encryption, cryptographic message authentication can also be achieved with key agreement combined with a message authentication code (MAC). In this approach, sender 20 and recipient 22 use a key agreement mechanism to establish a shared key. In store and forward applications such as e-mail and text messaging, it is preferable if the key agreement mechanism is non-interactive. More precisely, once sender 20 and recipient 22 have each other's public keys, sender 20 creates an authenticated message for recipient 22 without the recipient's participation. The trusted message 30 includes, among other components, a message authentication code (MAC). Recipient 22, upon receiving an incoming message, authenticates the message received by verifying that the MAC received is the same as a MAC computed locally using the shared key and the clear text message 26 received. Electronic messages that are authenticated are sorted into trusted folder 34 and those that fail the authentication are sent to regular folder 36.

Any key agreement mechanisms allowing this can be used. For example, static-static Diffie-Hellman key agreement allows this as does 1-Pass Menezes-Qu-Vanstone (MQV). Both these mechanisms are specified in IETF documents called Request For Comments (RFCs) for use in the S/MIME protocol, which is an IETF protocol that can be used to secure e-mail. These mechanisms are specified as part of the data structure called "AuthenticatedData" in the S/MIME terminology, which is an alternative to the "SignedData" data structure of S/MIME.

Methods combining key agreement with a message authentication code generally provide an assurance that a sender (who will be called "Alice") is not impersonated and that she can efficiently authenticate a message with a cost proportional to the sum of the message length and the number of recipients. When recipients (for example, Bob and Charles) ensure that messages are authenticated and segregate their incoming messages accordingly, they gain the protection against spam and phishing attacks, provided that they trust Alice's public key. This is further explained below.

For example, suppose that Alice is a spammer or phisher who broadcasts an electronic message to a large number of recipients. Suppose Bob is her recipient and he uses a filter that sorts electronic messages according to whether it is authenticated by a trusted public key, or just by an untrusted public key, or not authenticated at all. As a spammer or phisher, Alice has difficulties to get her public key trusted. Even if she obtains a trusted public key from a CA, soon the fact that she is a spammer or phisher will be detected by filters. Either her certificate will be revoked or the filters will reject or delete her messages as spam messages or phishing based on her public key. Such filters can reside on a different server from machines with the recipients' private key, because unauthenticated messages will not have proper formatting. If Alice does not bother to authenticate her electronic messages at all, then the filter will send her electronic messages into spam inbox, that Bob will generally ignore. Alice may attempt a compromise solution of using an untrusted public key. When she does this, however, she generally incurs a cost on per-recipient basis. She will need to use a key agreement calculation for each recipient. This can be expensive if there are many recipients. An iterated cryptographic computation or puzzle also can be included in the key agreement mechanism to further increase Alice's cost per recipient, as indicated above.

It will be appreciated that requiring a cryptographic operation and its verification, such as encryption and its verification, can have the benefit of introducing imbalance of computation loads on the sender and the receiver. Encryption or key passing typically requires intense mathematical computations. At the receiving end the statistical checks are relatively simple operations which tend not to place any significant burden on the recipient or the recipient's message server. As such, a spammer is more likely to be severely impeded from doing large bulk mailings without significantly affecting the normal electronic communication of recipients.

Using cryptographic techniques to filter electronic messages therefore tends to discourage flooding a large number of recipients with spam messages. It requires additional computation cost per broadcast, or per recipient when suitable methods are selected. In general, encryption operation tends to be a computation intensive process. Public key encryption or key passing typically requires further intense mathematical computations. Certain encryption algorithms, such as ECC, require significantly more time and processing power for a sender to encrypt a message than for the recipient to decrypt the message. This additional imbalance of computation load tends to provide additional disincentive for, and introduce additional resource barrier to, flooding a large number of users with spam messages.

Further, flooding a large number of recipients is often desirable in an advertising campaign. The efficiency measure of the advertising campaign typically relates to the percentage of such electronic messages being reviewed or read by the recipients. However, for such indiscriminate broadcasting of electronic messages to be effective, each targeted recipient must first accept the sender's public key, provide its public key, or establish a key with the sender in a key agreement so that the electronic messages can pass the cryptographic filters as "trusted messages". Otherwise, the electronic messages will be routed to a regular folder or rejected. As recipient assigns a lower priority to regular folder, the messages may not be read promptly or may never be read at all. Further, because the spammer must provide its key, messages associated with a key of any known spammer can be deleted immediately or sent to a special spam folder, as described above. Requiring electronic messages to include a result from a cryptographic operation therefore also tends to force the spammer to incur the cost of obtaining a key more frequently for broadcasting spam messages. These all tend to reduce the efficiency measure of an advertisement campaign and increase the spammer's cost of bulk mailing and thus tend to discourage investment of effort and resources in this type of indiscriminate spam broadcasting.

Figure 2:
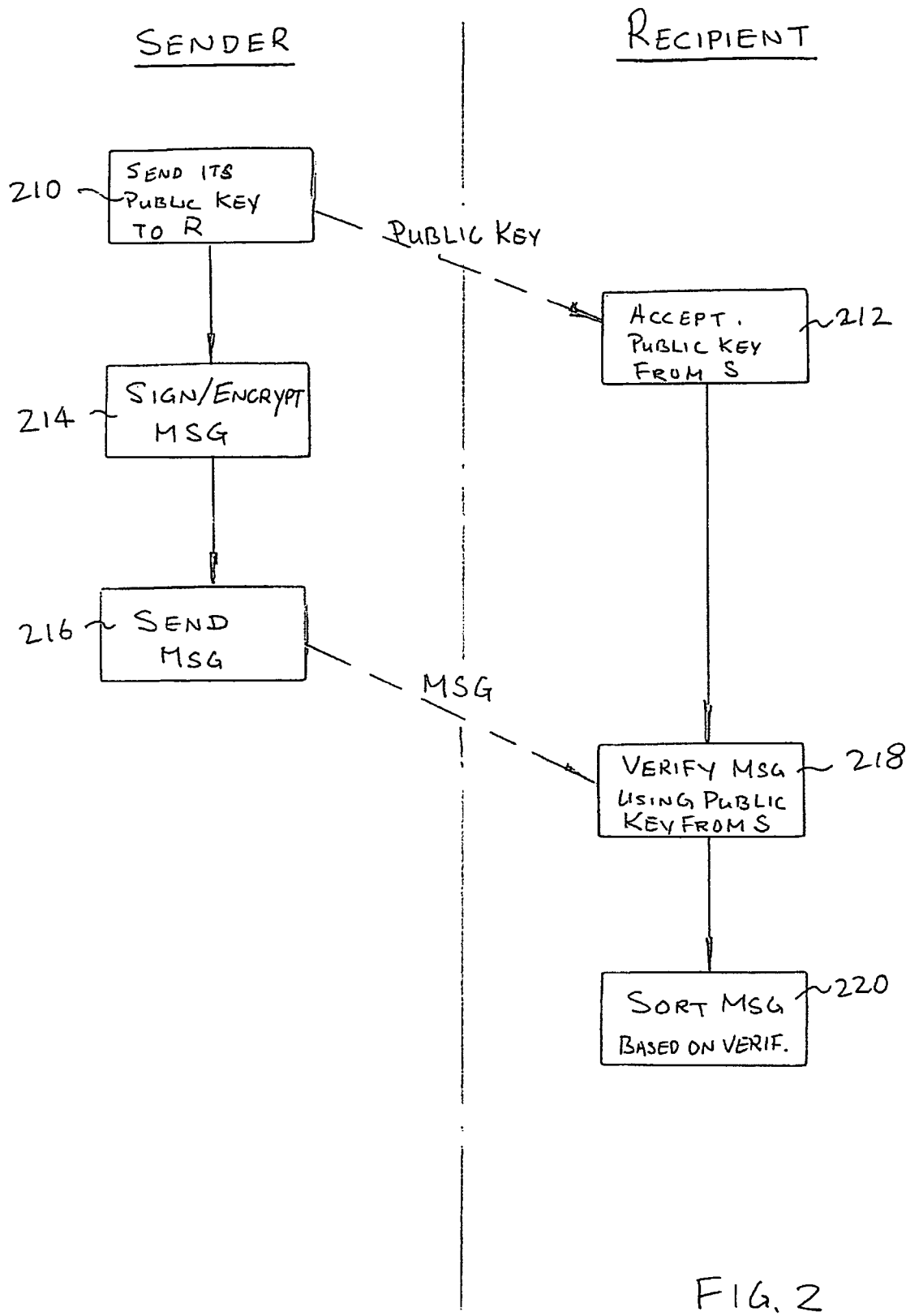
FIG. 2 shows steps of an exemplary process using digital signatures for filtering electronic messages as used in the system shown in FIG. 1.

FIG. 2 shows steps of an exemplary process for filtering electronic messages using cryptographic techniques. Sender 20 has a public/private key pair. As will be appreciated, private keys are generally kept secret. For example, sender may store its private key in a hardware security module for added safety. Public keys are transmitted to those that sender wishes to communicate with. As a first step, the sender 20 sends its public key (step 210) in a trusted fashion to recipient 22, who accepts it (step 212). This establishes a trust relationship between sender 20 and recipient 22 and indicates to sender 20 that it has permission to send recipient 22 electronic messages. This step generally only needs to be performed once.

Recipient 22 accepts the public key by, for example, storing it in a storage device accessible to the recipient computer. Recipient 22 may also accept the public key by, for example, informing the sender 20 its acceptance and requesting sender 20 to make the public key available for use by recipient 22 when needed. Although only one sender is described here, it is understood that recipient 22 may decide to accept public keys from a number of trusted senders and therefore be able to receive trusted messages from them. Likewise, a number of recipients may accept the public key of a single sender so the single user can send trusted messages to the group of recipients.

Once recipient 22 accepts a public key of sender 20, sender 20 may start sending trusted messages to recipient 22. Examples of trusted messages are messages that are signed or encrypted by sender 20. At step 214, sender 20 generates a trusted message 30 by digitally signing its electronic message, namely including in a message text its digital signature. Sender 20 may optionally encrypt the signed message with its private key. The trusted message, whether encrypted or not, is sent to recipient 22 using any standard message transfer protocol suitable for the type of message at step 216. For example, if the message is an e-mail message, trusted message 30 may be transferred using, for example, Simple Mail Transfer Protocol (SMTP) or X400 Message Handling Service Protocol (MHS). Or, the message may be an Internet phone message, in which case VoIP may be used to transfer the trusted message.

Optionally, cryptographic processing module 28 may solve a discrete logarithm problem and include the result in the trusted message at a step between steps 214 and 216. Alternatively or in addition, cryptographic processing module 28 may also perform some iteration computation such as repeated hashing or encryption between steps 214 and 216 and include the result in the trusted message 30.

The recipient 22 receives trusted message 30 and verifies the digital signature at step 218. If the result of computing a puzzle or iteration computation is included, the result is also verified at this time. If the verification of the digital signature (and the result of other cryptographic operations where included in the trusted message) is successful, it is assumed that the message received is indeed from the recipient 22. Successfully verified messages are stored in trusted folder 34. If the verification fails, or if the electronic message does not contain a digital signature, it is assumed that the electronic message is not from a trusted user. Such electronic messages are stored in regular folder 36. This completes the step (step 220) of sorting or filtering electronic messages.

As will be appreciated, for digital signatures to be successfully verified, the signature generation algorithm and the signature verification algorithm must be from the same signature scheme. Any digital signature scheme can be used. Some common examples include ECDSA and the Digital Signature Algorithm (DSA) family signature schemes.

Figure 3:
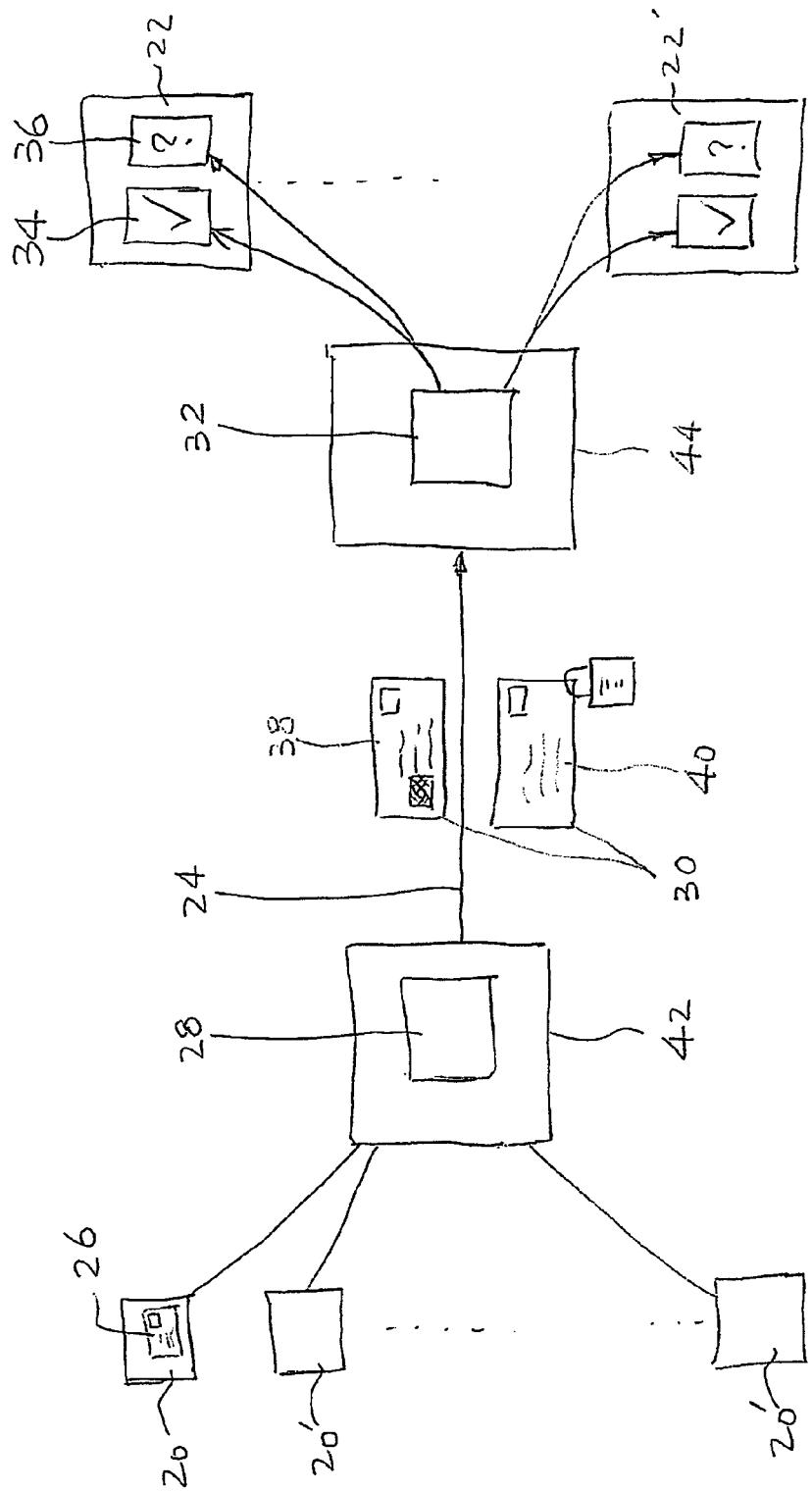
FIG. 3 shows schematically an alternative to the electronic message system shown in FIG. 1, in which electronic message servers perform and verify cryptographic operations on behalf of individual users of the system.

It is not necessary that only sender 20 can sign its message text to generate a trusted message 30. Likewise, it is not necessary that only recipient 22 can verify and filter incoming electronic messages. Referring to FIG. 3, there is shown separate sender message server 42 on the sender's side and recipient message server 44 on the recipient's side. Sender message server 42 may serve other senders 20' in addition to sender 20 and recipient message server 44 may likewise serve other recipients 22' in addition to recipient 22.

As an example, sender message server 42 keeps a copy of the sender's private key and recipient message server 44 keeps a copy or has access to a copy of the sender's accepted public key. Sender 20 forwards its clear text message 26 to the sender message server 42. Sender message server 42, which has a copy of the sender's private key, signs the message text on behalf of sender 20 to generate a trusted message 30 and then forwards the trusted message 30 to recipient message server 44. Recipient message server 44 verifies incoming messages and delivers the messages to trusted folder 34 or regular folder 36 of recipient 22 based on verification results. Encryption of messages and verification thereof may be performed in a similar fashion.

At organizational level, messages can be signed by an organization. For example, e-mail or adjunct server can perform encryption and signing. Another example is to support a hybrid or client and organizational signing. If two organizations trust each other through the exchange of organization pubic keys then there is no need for the individual users of those organizations to get permission to send messages by providing their individual public keys. Their messages would go to trusted or priority mail folders upon being signed and verified using the organization's public and private keys.

Scalability can also be achieved by assigning public keys to unique DNS names, thus automating the distribution of public keys.

This system can coexist with existing message systems without requiring a major overhaul. All users have a trusted inbox (i.e., a priority mailbox) and a regular inbox. Electronic messages that come from senders who use the cryptographic methods described here would be verified successfully. Messages from users who do not use cryptographic techniques are treated as regular messages and are routed to the regular inbox. A recipient would need to periodically manually check the regular inbox before all correspondents migrate to message systems using the cryptographic techniques as described here. Over time, one can migrate to trusted folder only and delete automatically all untrusted messages.

A user can change the public/private key pair and subsequently notify its trusted user community. This can be done by introducing a receipt once a user of the trusted user community accepts the updated public key. This could be "my trusted user group" just made up of receipts and/or contain users accepted by a recipient. Trusted user community is a handy list of organizations and users. If a key is compromised then a sender can notify its trusted user community. A user could change their trusted user community and regenerate a key pair if so desired. All or some of the users in the trusted community could be made aware of the change through a multi-cast.

To remove a user from a recipient's trusted user community, recipient 22 simply deletes that user's public key accepted previously. Any electronic messages sent with a bogus signature will be routed to a regular folder or may be immediately deleted. The system would be difficult to be spoofed if user's private key is unique and kept secret.

Figure 4:
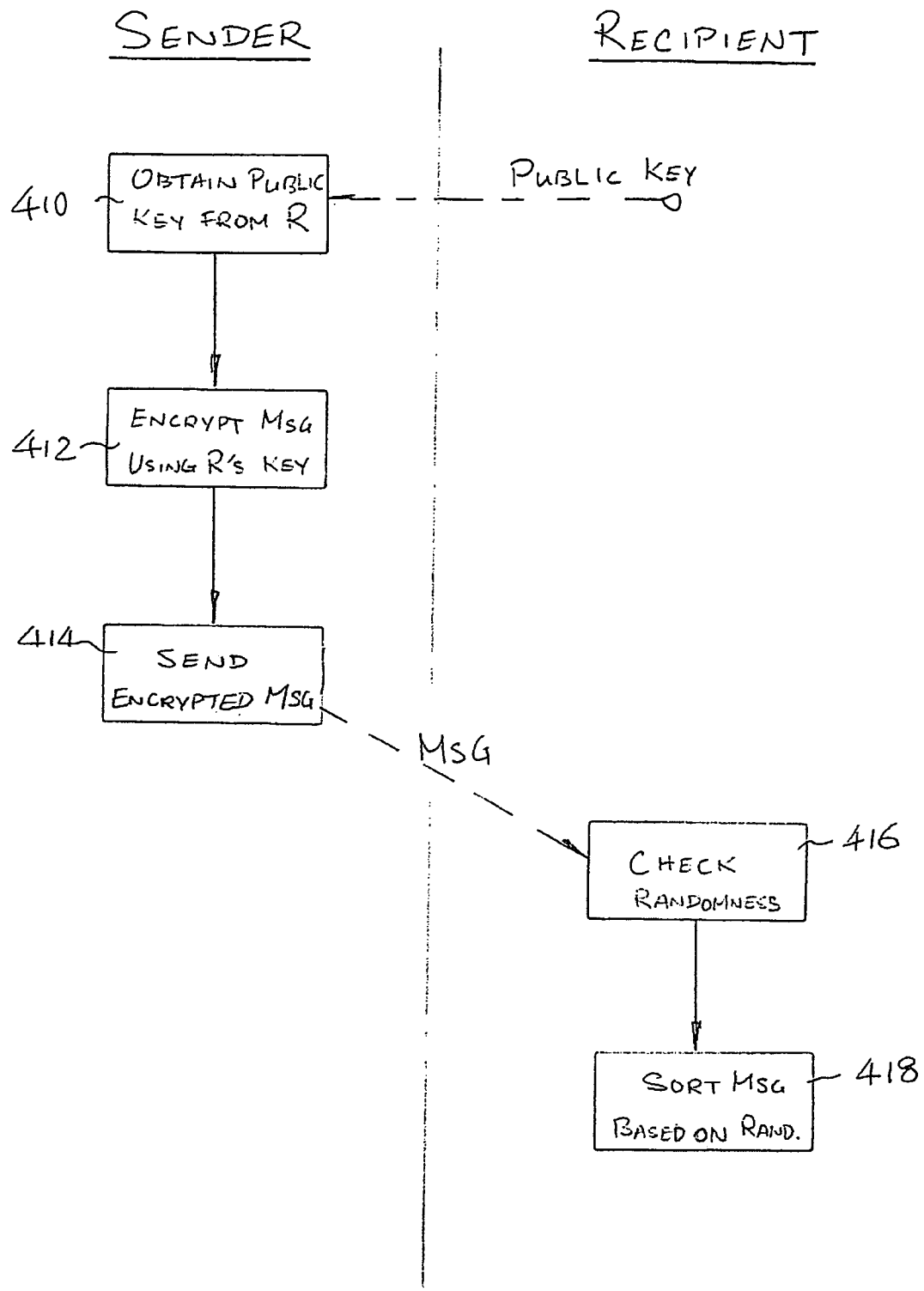
FIG. 4 shows steps of an exemplary process employed by either system shown in FIG. 1 or 3 that checks randomness of message data to filter electronic messages.

Referring to FIG. 4, there is shown steps of another example for filtering electronic messages. Recipient 22 has a public/private key pair. Before sender 20 can send a trusted message to recipient 22, sender 20 first obtains a public key from recipient 22 at step 410. The public key may be received directly from recipient 22, or may be obtained from a location made available by recipient 22. This establishes a trust relationship between sender 20 and recipient 22. Next, at step 412, sender 20 encrypts its message data using the public key obtained from recipient 22 to generate a trusted message 30. The trusted message in this case is the encrypted message. Sender 20 sends the trusted message 30 to recipient 22 at step 414.

Upon receipt of a message, recipient filter 32 performs a statistical test, or a number of statistical tests, on the message at step 416. The purpose is to determine whether the received message resembles random data. As will be appreciated, encrypted data contain no redundancy and tend to resemble random data. As such, messages consisting entirely of encrypted data can be distinguished from unencrypted or partially encrypted text based on results of statistical tests on randomness of the messages.

A message passes these statistical tests if it is or resembles random data. Messages resembling random data are forwarded to trusted folder 34. If a message fails any one of the statistical tests, it is assumed that it is not a trusted message and is sent to a different folder, namely a regular folder 36. Messages routed to regular folder 36 should be manually reviewed by recipient 22 periodically to determine whether they are spam messages. If an encrypted message is encrypted with the recipient's public key, the recipient can decrypt it using its private key whenever required. Recipient 22 will not be able to access the contents of an encrypted message if recipient 22 does not possess or have access to a key for decrypting the message.

Although the method described with reference to FIG. 4 requires the public key of recipient 22, the method is not restricted to sending electronic messages to a single recipient. Group messages can be sent to a group of trusted users, who may share a common pair of public/private keys. Users of a system implemented at organization level may all share the common pair of public/private keys of the organization. Alternatively, the method described here may be modified slightly for sending a trusted message to a number of recipients as a group electronic message.

Figure 5:
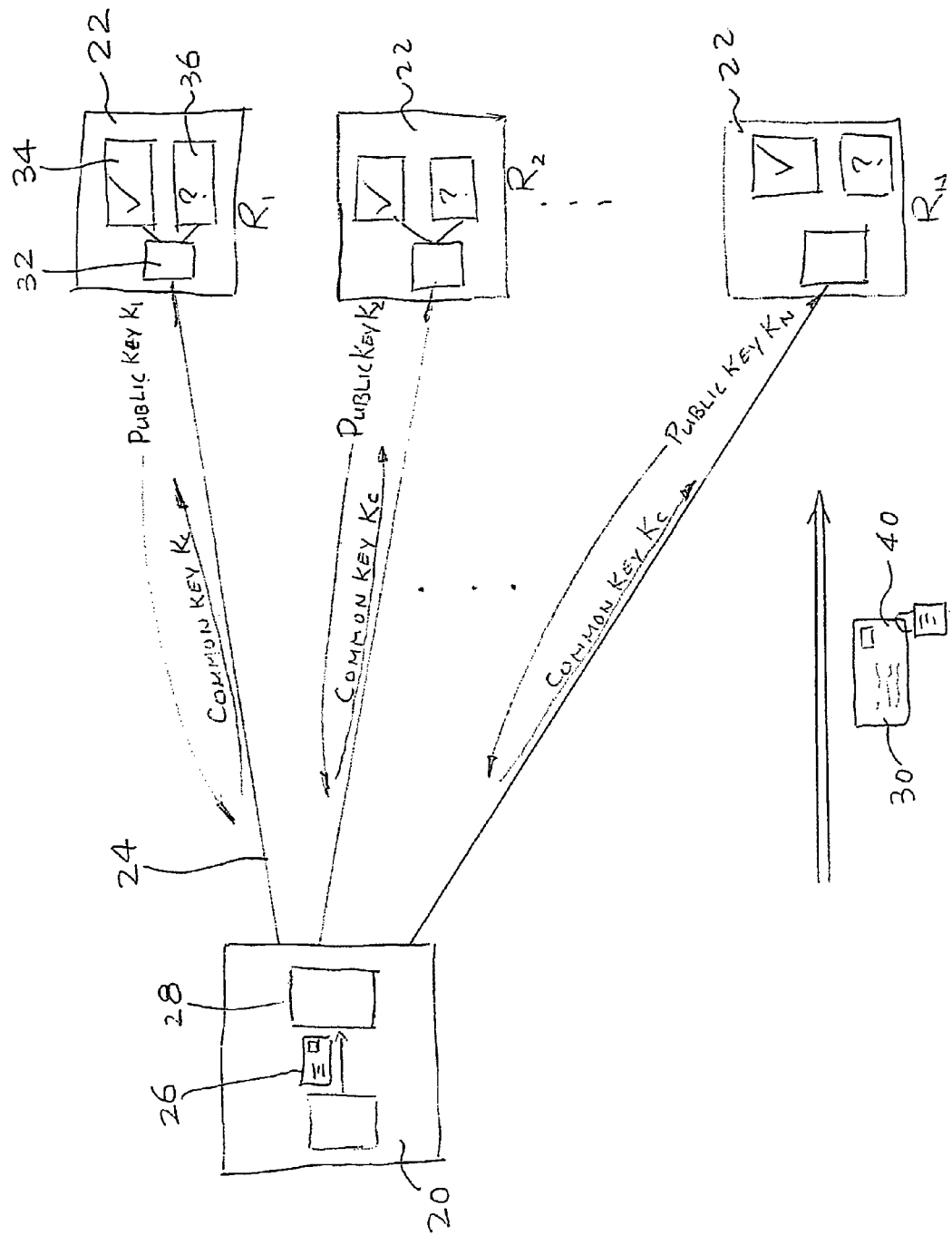
FIGS. 5 and 6 shows a system and method used by the system modified from that shown in FIG. 4 for sending and filtering a group electronic message.
Figure 6:
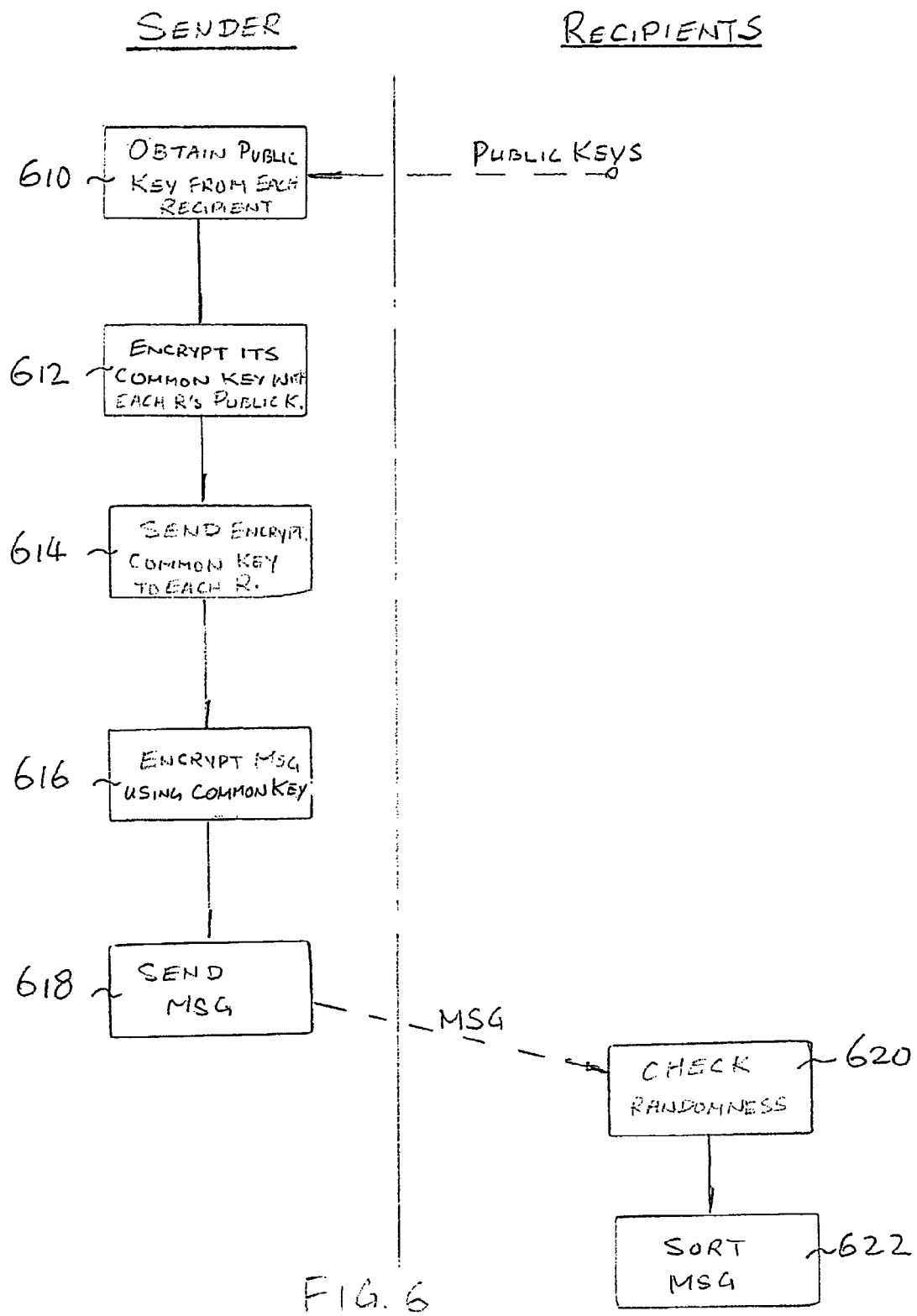

Referring to FIGS. 5 and 6, sender 20 is shown sending messages to a group of recipients 22. At step 610, sender 20 first obtains a public key from each one of the recipients 22. It will be appreciated that if sender 20 communicates with the group of recipients 22 regularly, it may already have the public key of each of the recipients of the group and therefore would not need to obtain the public keys again at step 610. Sender 20 selects a common key $k_c$ and encrypts it using each recipient's own public key at step 612. The common key $k_c$ may be a secret key for a symmetric-key algorithm. As different public keys are used to encrypt the common key $k_c$ for the group, the encrypted common key therefore has different form for each recipient 22 in the group. Sender 20 then sends the common key $k_c$ to each one of the recipients 22 in encrypted form at step 614.

Next at step 616, sender 20 encrypts its message data using common key $k_c$. The trusted message 30 in this case is the message encrypted with common key $k_c$. Sender 20 sends the trusted message to the group of recipients 22 at step 618. Each recipient 22 then performs statistical test or tests on the message received at step 620 and sorts the message at step 622 into trusted folder 34 or regular folder 36 based on test results.

As each recipient 22 has already received the common key $k_c$, the recipient may decrypt the encrypted message when needed. As will be appreciated, although for convenience of description, sending the common key $k_c$ and sending the encrypted message are described to be done at separate steps, the common key $k_c$ and the encrypted message may be included in the same electronic message sent by sender 20 in one step. This will require that the recipient or its software program be able to separate the common key $k_c$ from the encrypted message.

In addition to digital signatures and encryption, another form of authentication is key agreement combined with a message authentication code, such as a symmetric MAC. In this approach, sender 20 and recipient 22 use a key agreement mechanism to establish a shared key. As noted, a data structure called "AuthenticatedData" in the S/MIME terminology has been specified for the key exchange mechanisms for use in the S/MIME protocol. One of the known security disadvantages of the existing specifications of "AuthenticatedData" arises when the sender wishes to authenticate a message to multiple recipients. The current standard specifications allow this to be done in an efficient manner, but at the cost of causing some security concerns.

Figure 7:
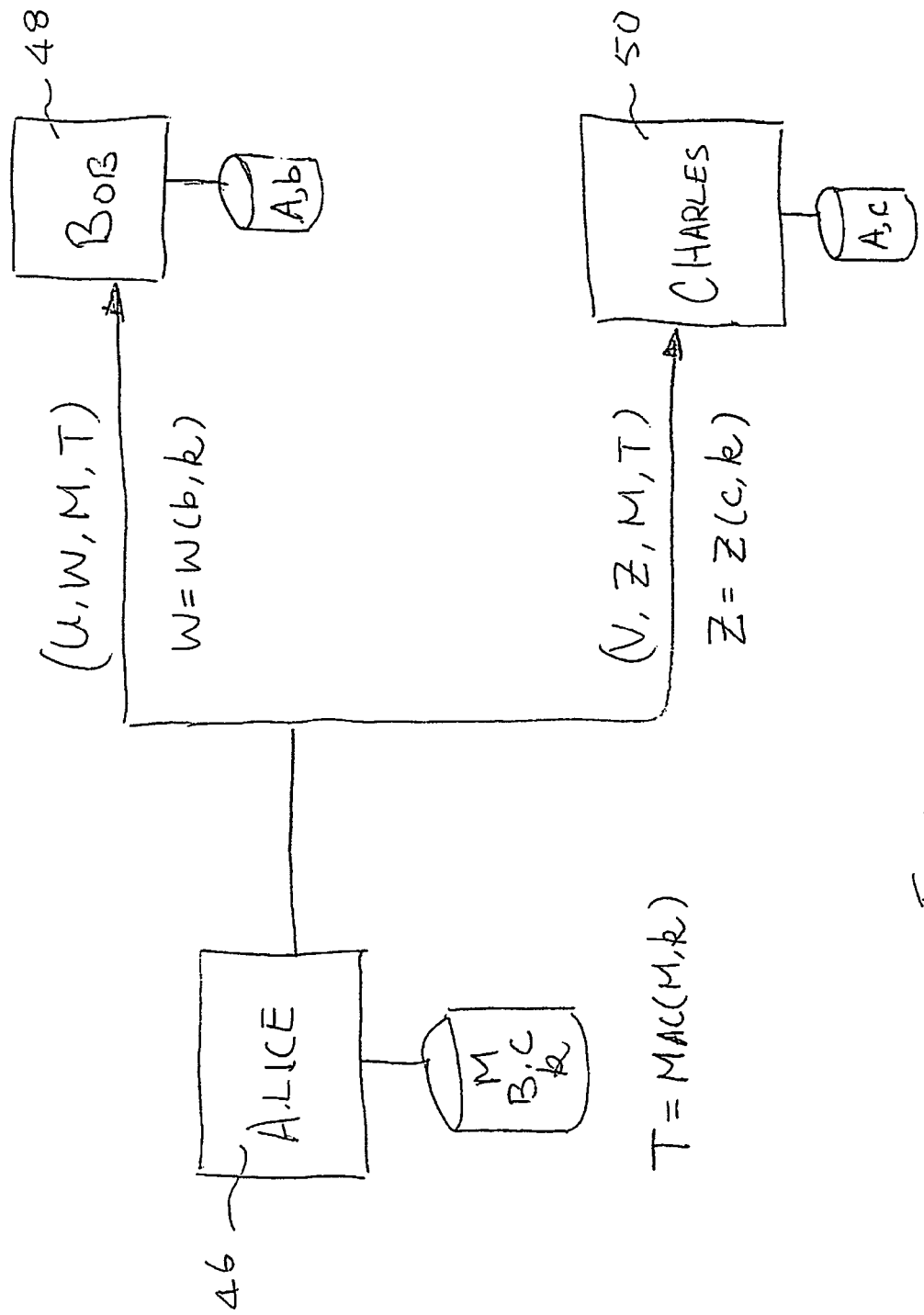
FIG. 7 illustrates schematically a prior art system in which a sender authenticates and sends an electronic message to two recipients.
Figure 8:
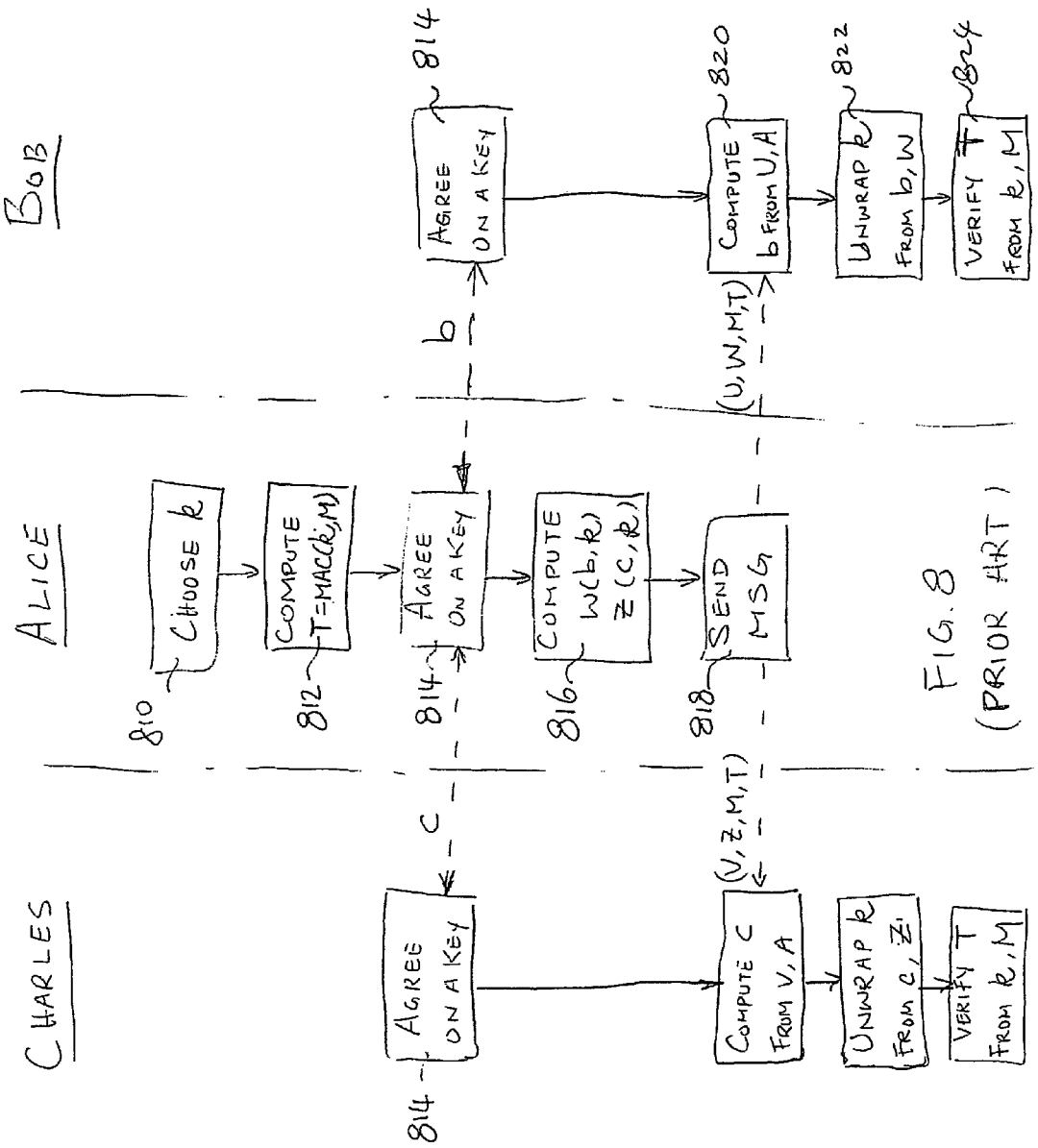
FIG. 8 shows steps followed by the sender and the two recipients of the prior art system shown in FIG. 7 to send and receive authenticated e-mail.

Before examples are provided to illustrate how key agreement combined with a MAC can be used for filtering electronic messages, it may be helpful to understand first the security concerns. Consider a system with three users, a sender Alice 46 and two recipients Bob 48 and Charles 50, as shown in FIG. 7. It will be appreciated that the scenario described below with reference to FIG. 7 and FIG. 8 is not limited to situations with only two recipients.

Alice has Bob's and Charles' public keys, B and C, respectively, while Bob and Charles each have Alice's public key A. Alice wishes to authenticate and send a message M to Bob and Charles. Referring to FIG. 8, Alice chooses a key k at step 810 first. She then computes a tag T=MAC(k, M) at step 812. A property of MAC is that only a party who knows k can compute T correctly. Therefore T can be used by parties that know k to authenticate M. If an adversary who did not know k attempted to modify or replace M with another message M', then the adversary would not be able to compute the changed tag T=MAC(k, M').

Now Alice has k, M and T. Alice will need to securely convey k to Bob and Charles so that they can verify that T=MAC(k, M). To do this, Alice uses key agreement with each of Bob and Charles at step 814. Alice will agree on key b with Bob and key c with Charles. Depending on the key agreement algorithm used, Alice may need to send some values to Bob and Charles, say U and V, respectively, so that Bob and Charles may compute their keys b and c established using the key agreement. Using b and c, Alice will encrypt the authentication key k, with what is usually called a key wrap function. Alice computes W=WRAP(b, k) and Z=WRAP(c, k) at step 816.

Alice sends (U, W, M, T) to Bob and (V, Z, M, T) to Charles at step 818. Optionally she can instead send (U,V,W,Z,M,T) to both Bob and Charles. Notice that Alice had to compute T just once, because she uses the same authentication key k for Bob and Charles. Therein lies the efficiency for Alice, because M may contain a large amount of data and computing T could take a long time. If Alice had to use a different authentication key for each of many recipients and the message was large, then Alice's cost would be proportional to the product of the message size and the number of recipients. With the efficient approach outlined above, the cost incurred by Alice is instead proportional to the sum of the message size and the number of recipients, which can be considerably less than the product.

For a better understanding of the potential security risk, it helps to see how Bob and Charles verify the authentication. Consider Bob, who receives data (U, W, M, T). First at step 820, Bob uses U and the key agreement algorithm with Alice's public key A to compute b, which is the key agreement key shared between Alice and Bob. Then at step 822, Bob uses b and W to decrypt, or unwrap, the authentication key k by computing k=UNWRAP(b, W). Once Bob has k, then he verifies at step 824 that T=MAC(k, M). Computations done by Charles are similar.

If Bob and Charles are honest, then the above approach is considered completely secure. However, if Bob is dishonest, then Bob can use k to modify or replace the message sent to Charles. Bob may either intercept the original message (V, Z, M, T) to extract V,Z or extract V,Z from (U,V,W,Z,M,T) if it is sent by Alice to both. Bob chooses some different message M' and computes T'=MAC(k, M') and sends (V, Z, M', T') to Charles. Bob may optionally intercept the original message (V, Z, M, T) to prevent its arrival to Charles, or he may just send (V, Z, M', T') at some later time. To Charles, (V, Z, M', T') appears to be authentic, that is it appears to be what Alice sent. This appearance is false. Bob has successfully impersonated Alice, which can be a serious security risk.

If Bob is unable to stop the valid message (V, Z, M, T) from reaching Charles first and Charles ensures that all authenticated messages have different V and Z, then the attack above may be prevented. However, it is undesirable to rely on the order of arrival of network messages when strong authentication is available. Furthermore it may be highly inconvenient for Charles to maintain and check history of all past values of V and Z ever sent by Alice.

Figure 9:
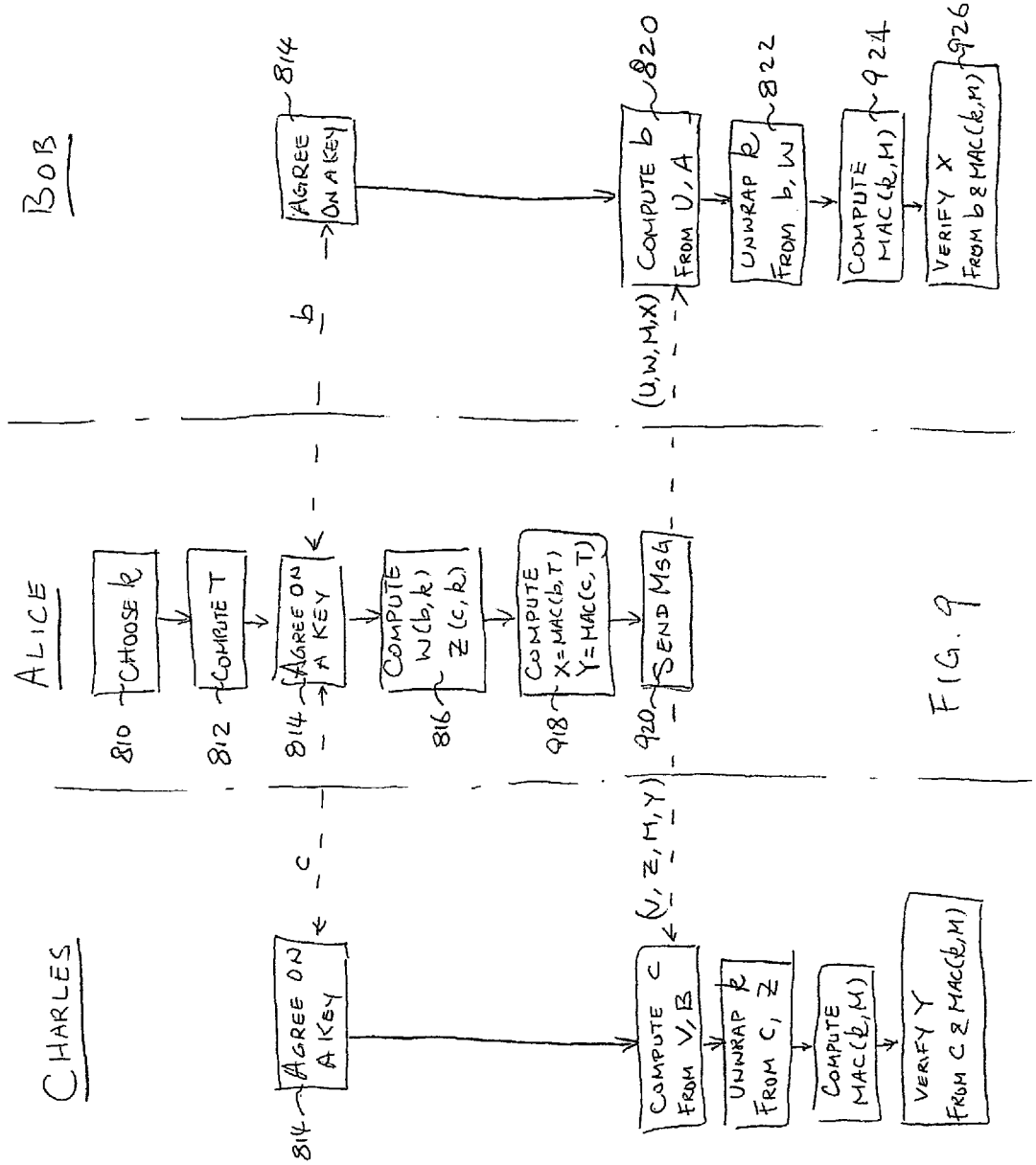
FIG. 9 shows steps of a method followed by the users of the systems shown in FIGS. 1 and 3 to send and receive authenticated e-mail.

In light of the security concerns described above, strong cryptographic techniques are needed to alleviate the risk associated with or to prevent this attack. Three exemplary methods are described here to illustrate the application of these techniques. Referring to FIG. 9, the first method is for Alice to send a different MAC tag to each recipient. Continuing with the example above, Alice performs the same steps from 810 to 816. At step 918, Alice computes X=MAC(b, T) and Y=MAC(c, T). Alice sends X instead of T to Bob and sends Y instead of T to Charles. In other words, she sends (U, W, M, X) to Bob and (V, Z, M, Y) to Charles at step 920. As before, Bob uses U at step 820 to obtain b and unwrap W at step 822 to obtain k, then computes MAC(k, M) at step 924. Bob has no T from Alice to check this against, so he continues to compute MAC (b, MAC(k, M)) and compares this tag against X at step 926. Bob checks that X=MAC(b, MAC(k, M)) to verify message M. Similarly, Charles checks that Y=MAC (c, MAC(k, M)). Now Bob's attack against Charles fails, because if Bob replaces M by M' and computes T'=MAC(k, M), he will still not able to compute Y'=MAC(C, T') because he does not know c.

Figure 10:
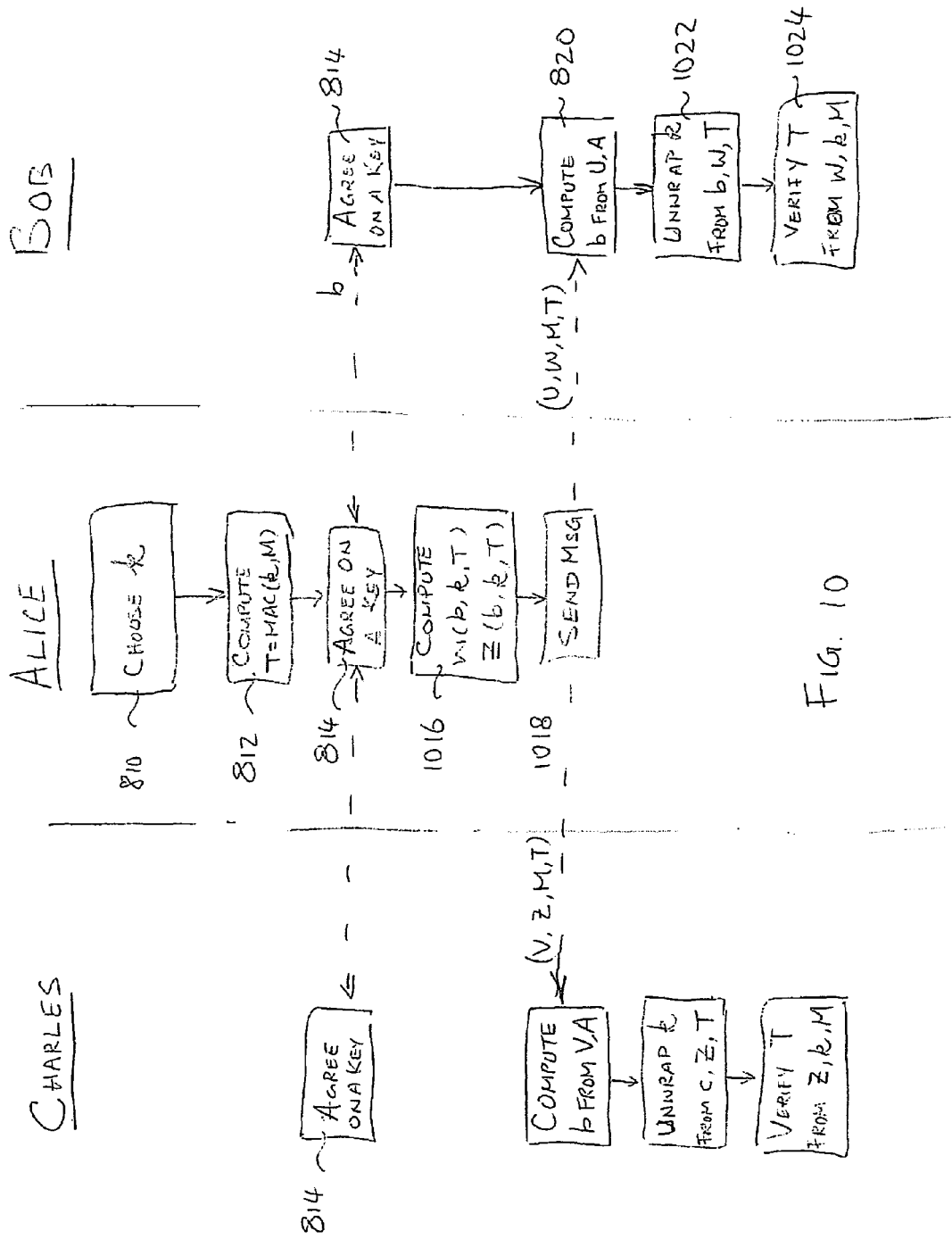
FIG. 10 shows steps of another method followed by the users of the systems shown in FIGS. 1 and 2 to send and receive authenticated e-mail.

Referring to FIG. 10, the second method is for Alice to include the MAC tag T as an authenticated parameter of the WRAP function. When Bob and Charles unwrap W and Z, respectively at step 1022, they will check that T was used as a parameter and that M can be successfully verified from T as an authenticated parameter of the WRAP function at the verification step 1024. If the message is verified, i.e., authenticated, successfully, it is sent to trusted folder 34; otherwise, it is routed to regular folder 36.

As will be appreciated, when T is included as an authenticated parameter of the WRAP function, the unwrap process can detect any modification of T. Therefore Bob is prevented from launching his Alice-impersonation attack against Charles, since Charles will detect and reject the modified tag T'. In this method, the tag T is usually embedded in W so there is generally no need to send T after the message. Alternatively, T can be outside of W, with W only containing enough information to verify T, in which case T must be sent.

The third method is for Alice to include the MAC tag T as part of the key agreement mechanism at a modified step 814. Most key agreement mechanisms use a key derivation function (KDF) to compute a key k from a raw shared secret s, as k=KDF(s). However, for various reasons, such raw shared secret may contain some detectable patterns, which may introduce security risks. Modern key derivation functions include an optional parameter P, so that k=KDF(s, P). Alice can include T in the optional KDF parameters. Doing this prevents Bob's attack, because if Bob changes T', then Charles will derive a different key agreement key c' than the key c that Alice used.

In the second and third methods described above, Alice may choose to change the order of the stream of data sent to Bob (and Charles and other recipients). Instead of sending Bob the tag T after the message, Alice can send the tag T before the message M (if she still needs to send T at all in the second method). The advantage to Bob in this is that Bob will have the value T which is needed to find the authentication k (because T is involved in the unwrap function or in the key derivation function). This makes k available before Bob receives the message M, thereby allowing Bob to begin computing MAC(k, M) as M is received. This is instead of buffering M in memory first, then computing k and calculating MAC(k, M), which requires a second pass of M. In other words, Bob can use stream processing. Conversely, if Alice wishes to use stream processing, then she would prefer to send U, W and T after M, so that she send M as she computes T MAC(k, M), and then compute and send U and W.

It will be appreciated that these exemplary methods using MAC for verifying a message as described here can work with most key agreement mechanisms, including symmetric and asymmetric mechanisms.

Encrypting an electronic message to multiple recipients also helps to alleviate the security problem with authentication addressed above. Suppose that Alice encrypts an electronic message to Bob and Charles. When Charles receives the message from Alice and sees that it contains sensitive content that only Alice could know, it is natural for Charles to conclude that only Alice could have send the electronic message. This could be called implicit authentication. If Bob is honest, then implicit authentication is reasonable, because most existing encryption algorithms today have the property that if an adversary attempts to tamper with an encrypted text, then it will appear at least somewhat garbled upon decryption. If the decrypted message appears ungarbled and contains information that only Alice could know, then Charles can deduce that no adversary could have sent the message or modified it. But if Bob is dishonest, then he will learn Alice's secrets in the message and can modify the message, and re-encrypt it to Charles. This attack is essentially the same as the attack on explicit authentication, and the same methods can be used to prevent it.

Signature-free authentication is desirable. Authentication with signatures does not have per recipient cost (unless combined with a puzzle or lengthy computation), so does not deter spam as effectively as using key agreement and a MAC. Another advantage of not using signatures for authentication is known as plausible deniability or prevention of surreptitious forwarding. Whenever Alice signs something in order to authenticate it to Bob, Bob will be able to prove to others that Alice signed something. In most protocols today Alice would sign the content of the message. This allows Bob to prove to others that Alice signed the message, which could be very desirable to Bob if the message is a contract or some other commitment. However, Alice may not want this. Indeed, a general principle with hand written signatures is to limit what one signs. It is desirable to be able to extended this principle to digital signatures. Therefore, Alice should prefer to not sign anything, if all she wants to do is to authenticate herself. In other words, if Alice authenticates a message to Bob, Alice prefers that Bob cannot prove to Charles that Alice signed the message received by Bob, or used her private key in any way.

A partial solution to this is for Alice to sign a function of the authentication key k and then compute a MAC tag T of the message as T=MAC(k, T). Bob will know that Alice signed k which indicates Alice authenticated a message M to Bob. But Bob cannot prove to Charles that Alice signed M because Bob could have replaced M by M' and T by T'. This can be achieved by using a key agreement that leaves no evidence at all that Alice authenticated anything to Bob. Suitable key agreements that can be used for this purpose include MQV and static-static DH, but not other protocols such as Station-to-Station that include digital signatures.

Although ECC is considered better suited than RSA to the task of deterring spam and phishing as explained above, it may be desirable to use RSA for signature-free authentication, for example, when only RSA is available to a user, which is possible in some already existing deployed legacy systems. Existing standards for RSA only admit signatures and public key encryption, but do not include a key agreement mechanism that could be securely combined with a MAC. Existing RSA standards require digital signatures. The following provides a mechanism whereby RSA can be used for authentication without having to generate digital signatures.

To achieve signature-free authentication with RSA, Alice and Bob generate RSA public keys A and B of approximately the same size. For simplicity, assume that Alice and Bob use the same public exponent e, though Alice and Bob may use different public exponents with appropriate modifications to the method described below. The private exponents of Alice and Bob are a and b, respectively. It is preferable for A and B to be close in size for efficiency. Public keys A and B can be very different in size, but the efficiency may suffer. Alice chooses a random authentication key k, and computes $Z=(F(k^e \bmod B))^a \bmod A$, where F is some fixed, public invertible function, such as the identity function or a symmetric encryption function with a fixed, public key. Alice computes T=MAC(k, M) and sends (Z, M, T) to Bob. Bob computes $k=(G(Z^e \bmod A))^b \bmod B$, where G is the inverse function of F, so that G(F(x))=x for all x. Alice may need to try several keys k to ensure that Bob will be able to recover k from Z. Very roughly, it generally takes Alice B/A attempts on average to find such a key k. If B and A are close, then this is not a problem. Notice that Bob can choose some Z and then compute k. In other words, both Alice and Bob are equally capable of producing corresponding pairs (k, Z). Therefore, Bob cannot prove to Charles that Alice generated the pair (k, Z) because Charles will know that Bob could just as easily have produced (k, Z). What makes this possible is that the input to Alice's private key operation has no redundancy, whereas in a conventional RSA digital signature the input has redundancy, and therefore only Alice could have generated the signature. It will be appreciated that the computation of Z from k consists of series of applications of essentially invertible operations including Alice's private RSA operation, Bob's public RSA operation, and fixed common public operations, and that other combinations may be used, with varying degrees of security and efficiency. The method described above is preferred, as it is believed to be most efficient of those combinations that appear secure.

It will be appreciated from the above discussions that cryptographic operations have been utilized to provide a filter to separate trusted incoming messages from other messages and to deter widespread broadcasting due to additional imposed computation costs.

Various embodiments of the invention have now been described in detail. Those skilled in the art will appreciate that numerous modifications, adaptations and variations may be made to the embodiments without departing from the scope of the invention. Since changes in and or additions to the above-described best mode may be made without departing from the nature, spirit or scope of the invention, the invention is not to be limited to those details but only by the appended claims.

What is claimed is:

1. A method of segregating electronic messages received from a sender from other messages in an electronic messaging system, comprising the steps of:
   the sender transmitting information relating to its encryption key in a trusted manner to the recipient,
   the recipient accepting the encryption key from the sender to indicate to the sender permission being given for the sender to send electronic messages to the recipient,
   performing a cryptographic operation on a clear text message of an electronic message from the sender employing the encryption key to obtain a result,
   producing a trusted message from the result and the electronic message,
   the recipient verifying that the result is obtained from the cryptographic operation utilizing the encryption key on the clear text message upon receipt of the trusted message,
   upon successful verification, assigning a marked priority to the trusted message, and
   segregating received electronic messages based on marked priority.

2. The method of claim 1 wherein the cryptographic operation is more computationally intensive than the verification operation.

3. The method of claim 1 wherein the result is a digital signature of the sender obtained from signing the clear text message and verifying the electronic message includes verifying the digital signature.

4. The method of claim 1 wherein the result is an encrypted message of the clear text message and verifying the electronic message includes verifying the encrypted message.

5. The method of claim 4 wherein verifying the encrypted message includes performing a statistical check to determine that the encrypted message resembles random data.

6. The method of claim 4 wherein verifying the encrypted message includes decrypting the encrypted message.

7. The method of claim 1 wherein the result is a message authentication code (MAC).

8. The method of claim 1, wherein the step of the recipient accepting the information to indicate permission being given includes providing a receipt to the sender.

9. A method of segregating electronic messages at a recipient, comprising the steps of:
   receiving information relating to an encryption key of a sender in a trusted manner from the sender,
   accepting the encryption key from the sender to indicate to the sender permission being given for the sender to send electronic messages to the recipient,
   examining an electronic message received by the recipient for evidence of a predetermined cryptographic operation, said predetermined cryptographic operation employing the encryption key, and
   responsive to said evidence of said predetermined cryptographic operation, segregating the electronic message from messages without said evidence of said predetermined cryptographic operation.

10. The method of claim 9, wherein the step of the recipient accepting the information to indicate permission being given includes providing a receipt to the sender.

11. A method of filtering electronic messages received for a recipient, comprising the steps of
   receiving information relating to an encryption key of a sender in a trusted manner,
   accepting the encryption key from the sender to indicate to the sender permission being given for the sender to send electronic messages to the recipient,
   verifying a digital signature in an electronic message, said digital signature being generated employing the encryption key, and
   deleting the electronic message if the verification fails.

12. The method of claim 11, wherein the step of the recipient accepting the information to indicate permission being given includes providing a receipt to the sender.

13. A method of filtering electronic messages received for a recipient, comprising the steps of
   receiving information relating to an encryption key of a sender in a trusted manner from the sender,
   accepting the encryption key from the sender to indicate to the sender permission being given for the sender to send electronic messages to the recipient,
   verifying a message authentication code (MAC) in an electronic message, said MAC being generated from the electronic message employing the encryption key, and
   deleting the electronic message if the verification fails.

14. The method of claim 13, wherein the step of the recipient accepting the information to indicate permission being given includes providing a receipt to the sender.

15. A system for use with an electronic messaging system to segregate trusted messages, the electronic messaging system delivering electronic messages from senders to recipients, the system comprising:
   a cryptographic processing module coupled to the electronic messaging system for performing a cryptographic operation on an electronic message for a recipient from a sender to obtain a result, the cryptographic operation employing a private key of the sender, a corresponding public key of which is sent in a trusted manner to and accepted by the recipient;
   means for sending said result to said recipient;
   a filter coupled to the electronic messaging system for receiving said result and detecting evidence of said cryptographic operation in said result utilizing said accepted public key, said filter marking said electronic message as a trusted message upon successful detection of said evidence; and
   a storage device having stored thereon public keys accepted by the recipient.

16. The system of claim 15, wherein said cryptographic processing module includes means for encrypting said electronic message to obtain an encrypted message as said result.

17. The system of claim 16, wherein said filter includes means for detecting encryption based on statistical checks.

18. The system of claim 15, wherein said cryptographic processing module includes means for generating a digital signature, said result being said digital signature, and said filter including means for verifying said digital signature.

19. The system of claim 15, wherein said cryptographic processing module includes means for generating a message authentication code for said electronic message, said result being said result and said filter including means for verifying said message authentication code.

20. The system of claim 15, wherein the electronic messaging system includes a sender message server for sending electronic messages and a recipient message server for receiving electronic messages, and wherein said cryptographic processing module receives said electronic message from said sender message server, said result is sent to said recipient message server, and said filter receives said electronic message and said result from said recipient message server.

21. The system of claim 15, further comprising:
means for generating a receipt and sending the receipt to the sender on behalf of the recipient when the recipient accepts the corresponding public key.

22. An electronic messaging system for delivering electronic messages from a sender to a recipient, said electronic messaging system segregating trusted electronic messages from other messages, comprising:
means for obtaining an electronic message from the sender;
a cryptographic processing module coupled to the electronic messaging system for performing a cryptographic operation on an electronic message for the recipient from the sender to obtain a result, the cryptographic operation employing a private key of the sender, a corresponding public key of which is sent in a trusted manner to and accepted by the recipient;
a sender message server for sending the electronic message to the recipient;
a recipient message server for receiving the electronic message;
a filter coupled to the electronic messaging system for receiving said result and detecting evidence of said cryptographic operation in said result, utilizing said accepted public key, said filter marking said electronic message as a trusted message upon successful detection of said evidence; and
a storage device having stored thereon public keys accepted by the recipient; and
means for sending said result to the filter.

23. The electronic messaging system of claim 22, further comprising:
a priority message folder for storing said message with the evidence; and
a regular message folder for storing said other messages.

24. The electronic messaging system of claim 22, further comprising:
a data file for storing an encryption key of said recipient; wherein said cryptographic processing module includes means for encrypting said electronic message using said encryption key to obtain an encrypted message as said result.

25. The electronic messaging system of claim 24, wherein said encryption key is a public key of said recipient.

26. The electronic messaging system of claim 22, wherein said cryptographic operation includes solving a discrete logarithm problem and said detection includes verifying a solution of said discrete logarithm problem.

27. The system of claim 22, further comprising:
means for generating a receipt and sending the receipt to the sender on behalf of the recipient when the recipient accepts the corresponding public key.

* * * * *